(12) United States Patent
Ikegami et al.

(10) Patent No.: US 7,367,200 B2
(45) Date of Patent: May 6, 2008

(54) EJECTOR CYCLE DEVICE

(75) Inventors: Makoto Ikegami, Anjo (JP); Hirotsugu Takeuchi, Nagoya (JP); Haruyuki Nishijima, Obu (JP); Hiroshi Oshitani, Toyota (JP); Etsuhisa Yamada, Kariya (JP); Takuo Maehara, Toyohashi (JP)

(73) Assignee: Denso Corporation, Kariya (JP)

( * ) Notice: Subject to any disclaimer, the term of this patent is extended or adjusted under 35 U.S.C. 154(b) by 309 days.

(21) Appl. No.: 11/335,797

(22) Filed: Jan. 19, 2006

(65) Prior Publication Data

US 2006/0156745 A1 Jul. 20, 2006

(30) Foreign Application Priority Data

Jan. 20, 2005 (JP) ............... 2005-012594
Aug. 18, 2005 (JP) ............... 2005-237305

(51) Int. Cl.
*F25B 47/00* (2006.01)
*F25B 1/06* (2006.01)

(52) U.S. Cl. .......................... 62/278; 62/500

(58) Field of Classification Search .............. 62/170, 62/174, 191, 278, 500, 512; 417/76, 87, 417/151

See application file for complete search history.

(56) References Cited

U.S. PATENT DOCUMENTS

| | | | | |
|---|---|---|---|---|
| 3,670,519 A | * | 6/1972 | Newton | 62/116 |
| 4,301,662 A | * | 11/1981 | Whitnah | 62/238.4 |
| 6,092,379 A | * | 7/2000 | Nishida et al. | 62/200 |
| 6,477,857 B2 | | 11/2002 | Takeuchi et al. | |
| 6,550,265 B2 | * | 4/2003 | Takeuchi et al. | 62/324.2 |
| 6,574,987 B2 | | 6/2003 | Takeuchi et al. | |
| 6,729,149 B2 | * | 5/2004 | Takeuchi | 62/191 |
| 6,799,435 B2 | * | 10/2004 | Saito et al. | 62/500 |
| 6,834,514 B2 | * | 12/2004 | Takeuchi et al. | 62/500 |
| 6,857,286 B2 | * | 2/2005 | Ohta et al. | 62/498 |
| 6,923,019 B2 | * | 8/2005 | Kawakubo et al. | 62/506 |
| 2003/0066301 A1 | * | 4/2003 | Takeuchi | 62/191 |
| 2003/0200764 A1 | * | 10/2003 | Takeuchi et al. | 62/500 |
| 2004/0031596 A1 | * | 2/2004 | Nishida et al. | 165/140 |
| 2004/0079102 A1 | * | 4/2004 | Umebayashi et al. | 62/324.1 |
| 2005/0178150 A1 | | 8/2005 | Oshitani et al. | |
| 2005/0268644 A1 | | 12/2005 | Oshitani et al. | |

FOREIGN PATENT DOCUMENTS

JP 2004-53028 A * 2/2004

* cited by examiner

*Primary Examiner*—Mohammad M. Ali
(74) *Attorney, Agent, or Firm*—Harness, Dickey & Pierce, PLC

(57) ABSTRACT

An ejector cycle device includes an ejector having a nozzle portion which decompresses refrigerant flowing out of a radiator, a first evaporator for evaporating refrigerant from the ejector, and a second evaporator provided in a branch passage that is branched from a position between the refrigerant radiator and the ejector and is connected to a refrigerant suction port of the ejector. Furthermore, a throttle member is disposed in the branch passage to decompress refrigerant and adjust a flow amount of refrigerant, and the second evaporator is disposed in the branch passage between the throttle member and the refrigerant suction port. In the ejector cycle device having both the first and second evaporators, a defrosting operation of one the first and second evaporators can be performed while the other one of the first and second evaporators is operated to have a cooling function.

16 Claims, 8 Drawing Sheets

EJECTOR CYCLE DEVICE

CROSS-REFERENCE TO RELATED APPLICATION

This application is related to and claims priority from Japanese Patent Applications No. 2005-12594 filed on Jan. 20, 2005 and No. 2005-237305 filed on Aug. 18, 2005, the contents of which are hereby incorporated by reference.

BACKGROUND OF THE INVENTION

1. Field of the Invention

The present invention relates to an ejector cycle device having an ejector, which is used for decompressing a fluid while being used as a kinetic pump for transmitting a fluid by entrainment function of a driving fluid jetted at a high speed. For example, the ejector cycle device can be suitably used as a refrigerant cycle for cooling plural different-temperature cooling subjects.

2. Description of Related Art

A vapor-compression refrigerant cycle device (ejector cycle device) having an ejector 62 is described in JP Patent No. 3322263 (corresponding to U.S. Pat. Nos. 6,477,857 and 6,574,987). The ejector cycle device includes a compressor 60, a refrigerant radiator 61, the ejector 62, first and second evaporators 63, 64 and a gas-liquid separator 65. The first evaporator 63 is located between a refrigerant discharge side of the ejector 62 and the gas-liquid separator 65, and the second evaporator 64 is located between a refrigerant suction port of the ejector 62 and a refrigerant outlet of the gas-liquid separator 65.

In this ejector cycle device, a throttle open degree of a nozzle portion of the ejector 62 is controlled, so that refrigerant at an outlet side of the first evaporator 63 becomes in a gas-liquid two-phase state while a cooling capacity of the second evaporator 64 is controlled. In this case, the cooling capacity of the first evaporator 63 is operatively linked with the cooling capacity of the second evaporator 64, and it is difficult to suitably control the cooling capacities of both the first and second evaporators 61, 62.

In addition, when the temperature of refrigerant in one of the evaporators 63, 64 is reduced to a temperature lower than 0° C., moisture contained in air is frozen on the one evaporator. The flow of refrigerant to the one evaporator may be stopped for performing a defrosting operation of the one evaporator. However, in this ejector cycle device, both of the flow of refrigerant to the first evaporator 63 and the flow of refrigerant to the second evaporator 64 need to be stopped.

SUMMARY OF THE INVENTION

In view of the foregoing problems, it is an object of the present invention to provide an ejector cycle device having at least first and second evaporators which can be selectively operated while easily controlling its temperatures.

It is another object of the present invention to provide an ejector cycle device having first and second evaporators respectively having cooling capacities, in which even when one of the first and second evaporators is stopped, the other one of the first and second evaporators can be effectively operated.

According to an aspect of the present invention, an ejector cycle device includes a compressor for compressing refrigerant, a refrigerant radiator disposed to radiate heat of refrigerant discharged from the compressor, an ejector including a nozzle portion which decompresses refrigerant flowing out of the refrigerant radiator by converting pressure energy of the refrigerant to speed energy thereof, a first evaporator for evaporating refrigerant flowing out of the ejector, a branch passage, which is branched from a position between a refrigerant downstream side of the refrigerant radiator and the ejector and is connected to a refrigerant suction port of the ejector, a throttle member disposed in the branch passage to decompress refrigerant and adjust a flow amount of refrigerant, and a second evaporator disposed in the branch passage between the throttle member and the refrigerant suction port.

In the ejector cycle device, a defrosting means is provided to perform a defrosting operation of one the first and second evaporators while the other one of the first and second evaporators is operated to have a cooling function. Accordingly, the cooling capacity of the second evaporator can be adjusted by the throttle member, while the cooling capacity of the first evaporator can be adjusted by using the nozzle portion of the ejector. In the ejector cycle device having at least the first and second evaporators, one of the first and second evaporators can be defrosted while the other one thereof can be operated to have cooling function.

For example, the defrosting means is a shutting means provided in the throttle member. In this case, the shutting means shuts a flow of refrigerant to the second evaporator when the defrosting operation of the second evaporator is performed. Alternatively, the defrosting means is a bypass circuit, which is provided such that refrigerant bypasses the second evaporator during the defrosting operation. In this case, the bypass circuit can be provided with a passage switching member located at an upstream position of the second evaporator, and a bypass passage through which refrigerant bypasses the second evaporator during the defrosting operation.

Alternatively, the defrosting means is a bypass circuit, which is provided such that refrigerant bypasses the first evaporator during the defrosting operation. In this case, the bypass circuit can be provided with a passage switching member located between the ejector and an upstream position of the first evaporator, and a bypass passage through which refrigerant bypasses the first evaporator during the defrosting operation. Alternatively, the bypass circuit can be provided with a passage switching member located in the branch passage between the second evaporator and the refrigerant suction port, and a bypass passage through which refrigerant from the second evaporator bypasses the ejector and the first evaporator during the defrosting operation of the first evaporator.

In the ejector cycle device, first and second branch passages can be provided. For example, the first branch passage is branched from a position between a refrigerant downstream side of the refrigerant radiator and the nozzle portion of the ejector, and is connected to a refrigerant suction port of the ejector. In contrast, the second branch passage is branched from the first branch passage at an upstream side of a throttle member in the first branch passage, and is connected to a downstream side of the first evaporator. Accordingly, plural evaporators more than two can be provided in the ejector cycle device using the first and second branch passages. In this case, the ejector cycle device can be used to cool plural different cooling subjects using the plural evaporators, respectively.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF PREFERRED EMBODIMENTS

Figure 1:
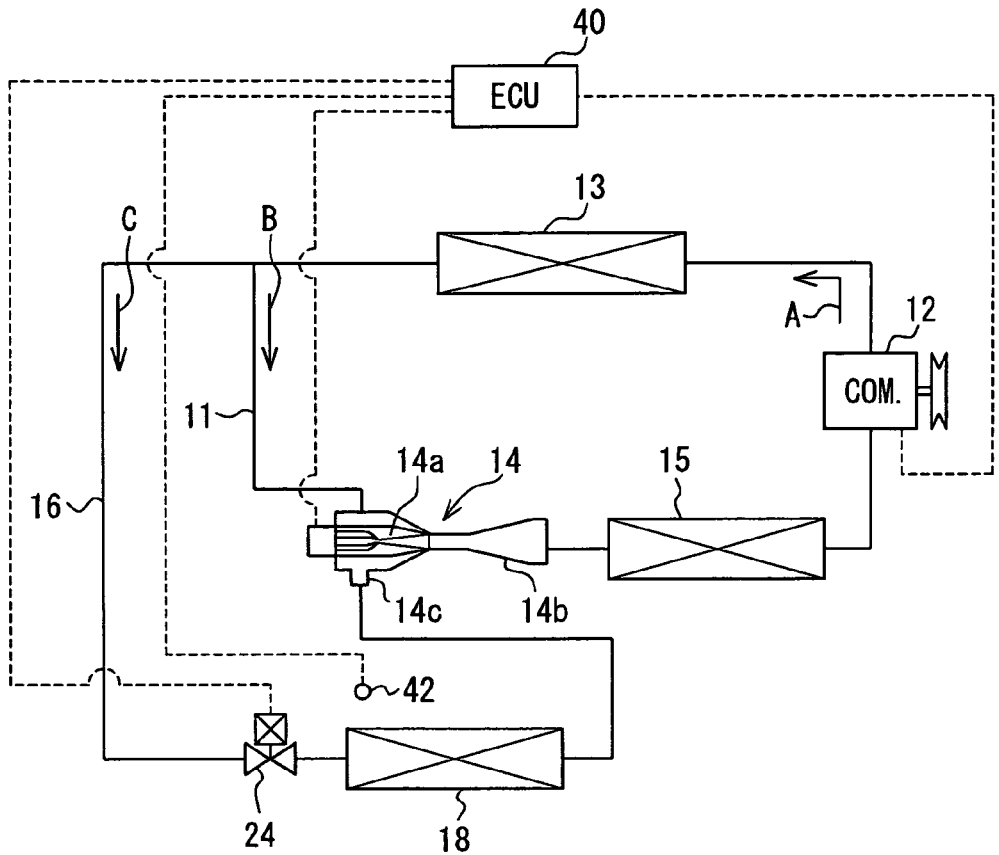
FIG. 1 is a schematic diagram showing an ejector cycle device according to a first embodiment of the present invention.

Preferred embodiments of the present invention will be described hereinafter with reference to the appended drawings.

First Embodiment

An ejector cycle device of the first embodiment can be suitably used as a refrigerant cycle device for a vehicle having a refrigerator, or as a refrigerant cycle device for a refrigerator having temperature-different compartments such as a freezer compartment and a refrigerator compartment, for example.

The refrigerant cycle device includes a refrigerant circulating path 11 in which refrigerant flows in this order of a discharge side of a compressor 12, a refrigerant radiator 13, an ejector 14, a first evaporator 15 and a suction side of the compressor 12.

In this embodiment, the compressor 12 for compressing refrigerant can be driven and rotated by a vehicle engine or an electrical motor. For example, the compressor 12 is a variable displacement compressor in which a refrigerant discharge capacity can be adjusted by adjusting its displacement. The refrigerant radiator 13 is arranged at a refrigerant discharge side of the compressor 12. The refrigerant radiator 13 cools high-pressure high-temperature refrigerant discharged from the compressor 12 by performing a heat exchange between the high-pressure refrigerant and a fluid such as air blown by a cooling fan (now shown).

The ejector 14 is disposed downstream from the refrigerant radiator 13 in a refrigerant flow. The ejector 14 is a decompression unit for decompressing refrigerant, and is also a kinetic pump for performing a transporting of a fluid by entrainment of a jet flow of a drive fluid injected at a high speed. Specifically, the ejector 14 includes a nozzle portion 14a, a mixing portion 14d and a diffuser portion 14b. The nozzle portion 14a decompresses and expands refrigerant flowing from the refrigerant radiator 13 substantially in isentropic by reducing a refrigerant passage sectional area. The refrigerant flow speed is increased in the nozzle portion 14a by converting pressure energy of the refrigerant to speed energy of the refrigerant. A needle valve 14e for controlling a throttle open degree of the nozzle portion 14a is arranged coaxially with a jet pot of the nozzle portion 14a, and is movable in an axial direction of the nozzle portion 14a by an actuator 14f. The ejector 14 has a refrigerant suction port 14c from which gas refrigerant from a second evaporator 18 is drawn by the high-speed refrigerant stream jetted from the nozzle portion 14a.

The mixing portion 14d and the diffuser portion 14b are provided downstream from the nozzle portion 14a. In the mixing portion 14d, refrigerant drawn from the suction port 14c and refrigerant jetted from the nozzle portion 14a are mixed, and the mixed refrigerant flows through the diffuser portion 14b. The speed energy of refrigerant (dynamic pressure) is converted to the pressure energy of refrigerant (stationary pressure) in the diffuser portion 14b by gradually increasing a passage sectional area of the diffuser portion 14b.

The refrigerant flowing out of the diffuser portion 14b of the ejector 14 flows into the first evaporator 15. For example, the first evaporator 15 is disposed to cool an interior of a refrigerator by performing heat exchange between refrigerant and air to be blown into the refrigerator. Low-pressure refrigerant decompressed in the ejector 14 is evaporated in the first evaporator 15 by absorbing heat from air to be blown into the refrigerator, thereby the first evaporator 15 has a cooling function. The gas refrigerant evaporated in the first evaporator 15 is drawn into the compressor 12, and is circulated in the refrigerant circulating path 11.

A branch passage 16 is branched from the refrigerant circulating path 11 at a branch portion between the refrigerant radiator 13 and the ejector 14. The branch passage 16 is a refrigerant passage from the refrigerant branch portion of the refrigerant circulating path 11 to the refrigerant suction port 14c of the ejector 14.

An electromagnetic throttle value 24 is provided in the branch passage 16, and the second evaporator 18 is arranged in the branch passage 16 at a downstream refrigerant side of the throttle valve 24. The throttle valve 24 is operated based on a signal of a control device 40 (ECU) to have a decompression function, a flow-amount adjusting function and a throttle passage switching function in the ejector 14. In this embodiment, the throttle valve 24 is set to completely close the throttle passage of the nozzle portion 14a in the ejector 14.

The control device 40 controls operation of components of the ejector cycle device, such as the compressor 12, the actuator 14f of the ejector 14 and the throttle valve 24.

Next, operation of the refrigerant cycle device will be described. First, a normal operation of the ejector cycle device, where both the first evaporator 15 and the second evaporator 18 are operated simultaneously, will be now described. In the normal operation, when the compressor 12 is driven by a driving device (for example, an engine), high-temperature and high-pressure refrigerant compressed by and discharged from the compressor 12 flows into the refrigerant radiator 13 as the arrow A in FIG. 1. Heat of high-temperature refrigerant is radiated outside of the refrigerator by performing heat exchange in the refrigerant radiator 13. Refrigerant flowing out from the refrigerant radiator 13 flows into the ejector 14 through the refrigerant circulating path 11 as in the arrow B in FIG. 1, while flowing into the second evaporator 18 through the branch passage 16 as in the arrow C in FIG. 1.

The refrigerant flowing into the ejector 14 is decompressed in the nozzle portion 14a. The nozzle portion 14a converts pressure energy of the high-pressure refrigerant to speed energy, and jets high-speed refrigerant from its jet port. Therefore, a pressure of refrigerant at the jet port of the nozzle portion is reduced, and gas refrigerant from the second evaporator 18 is drawn into the mixing portion 14d of the ejector 14 by a pressure difference between the pressure of refrigerant around the jet port of the nozzle portion 14a and the pressure of refrigerant at the refrigerant outlet of the second evaporator 18.

The refrigerant jetted from the nozzle portion 14a and the refrigerant drawn from the suction port 14c are mixed in the mixing portion 14d and flow into the diffuser portion 14b. Because the passage sectional area is enlarged in the diffuser portion 14b, the speed energy of the refrigerant is converted to the pressure energy in the diffuser portion 14b, so that the pressure of refrigerant is increased in the diffuser portion 14b. The pressurized refrigerant flowing out of the outlet port of the diffuser portion 14b flows into the first evaporator 15.

In the first evaporator 15, the refrigerant is evaporated by absorbing heat from air flowing to a first compartment of the refrigerator. That is, refrigerant in the first evaporator 15 is evaporated by absorbing heat from air inside the refrigerator. The gas refrigerant from the first evaporator 15 is drawn into the compressor 12 and is compressed in the compressor 12 to be circulated in the refrigerant circulating path 11.

The refrigerant flowing into the branch passage 16 from the refrigerant radiator 13 as in the arrow C in FIG. 1 is decompressed by the throttle valve 24, and is evaporated by absorbing heat from air flowing into a second compartment of the refrigerator. Therefore, the interior of the refrigerator is cooled. The gas refrigerant flowing out of the second evaporator 18 flows into the suction port 14c of the ejector 14. The gas refrigerant drawn into the ejector 14 from the second evaporator 18 is mixed with the refrigerant jetted by the nozzle portion 14a, and flows into the first evaporator 15 to be circulated.

In the normal operation of the refrigerant cycle device of the first embodiment, the temperature of refrigerant flowing to the second evaporator 18 can be set at a predetermined temperature by the throttle valve 24. Because of the pressurization in the mixing portion 14d and the diffuser portion 14b of the ejector 14, a pressure difference is generated between the first evaporator 15 and the second evaporator 18. That is, the refrigerant evaporation pressure of the first evaporator 15 corresponds to the pressure after pressure-increased in the diffuser portion 14b. In contrast, because the refrigerant outlet side of the second evaporator 18 is coupled to the refrigerant suction port 14c of the ejector 14, a reduced pressure immediately after decompressed at the nozzle portion 14a is applied to the second evaporator 18.

Accordingly, the refrigerant evaporation pressure of the second evaporator 18 can be made lower than the refrigerant evaporation pressure of the first evaporator 15 by a predetermined pressure. Therefore, the refrigerant evaporation temperature of the second evaporator 18 can be made lower than the refrigerant evaporation temperature of the first evaporator 15 by a predetermined temperature. That is, the predetermined temperature difference can be set between the first evaporator 15 and the second evaporator 18 due to the pressure difference.

Furthermore, the throttle open degree of the nozzle portion 14a is controlled by the needle valve 14e of the ejector 14 to control a super-heating degree of refrigerant at the outlet of the first evaporator 15, so that liquid refrigerant does not return the compressor 12.

Thus, a cooling capacity in a relatively low temperature range suitable to the cooling operation in the second compartment (e.g., freezer compartment) of the refrigerator can be obtained by the second evaporator 18, while a cooling function in a relatively high temperature range suitable to the cooling operation in the first compartment (e.g., refrigerator compartment) of the refrigerator can be obtained by the first evaporator 15. That is, because the refrigerant temperature of the first evaporator 15 and the refrigerant temperature of the second evaporator 18 can be respectively independently controlled, the cooling capacity of the first evaporator 15 and the cooling capacity of the second evaporator 18 can be respectively suitably controlled in the normal operation of the ejector cycle device.

Next, defrosting operation of the second evaporator 18 will be now described.

The control device 40 determines whether or not the second evaporator 18 is frosted based on a temperature signal from a temperature sensor 42 disposed near the second evaporator 18 or a refrigerant temperature in the second evaporator 18. Alternatively, the control device 40 determines whether or not the second evaporator 18 is frosted, by determining whether or not the refrigerant temperature lower than a predetermined temperature is supplied to the second evaporator 18 for a predetermined time. When the control device 40 determines that the second evaporator 18 is frosted, the electromagnetic throttle valve 24 is controlled by the control device 40 so as to fully close the throttle open degree of the throttle valve 24. Because the throttle valve 24 is closed, refrigerant does not flow through the second evaporator 18 through the throttle valve 24. In this case, all the refrigerant flowing out of the refrigerant radiator 13 flows into the ejector 14 through the refrigerant circulation path 11.

In the defrosting operation, the nozzle portion 14a is operated as a normal decompression valve. Refrigerant decompressed in the nozzle portion 14a of the ejector 14 flows into the first evaporator 15 to cool the interior of the refrigerator. Then, the evaporated refrigerant is drawn into the compressor 12, and is circulated in the refrigerant circulating path 11. Even in this case, the needle valve 14e controls the throttle open degree of the nozzle portion 14a so as to control the cooling capacity of the first evaporator 15. Furthermore, the super-heating degree of the first evaporator 15 is controlled by the needle valve 14e of the ejector 14, so that liquid refrigerant does not return the compressor 12.

According to the first embodiment, the flow of refrigerant to the second evaporator 18 is stopped when the defrosting operation of the second evaporator 18 is performed. Even in the defrosting operation of the second evaporator 18, because refrigerant can be continuously supplied to the first evaporator 15, the cooling operation in the first evaporator 15 can be continuously performed.

Second Embodiment

Figure 3:
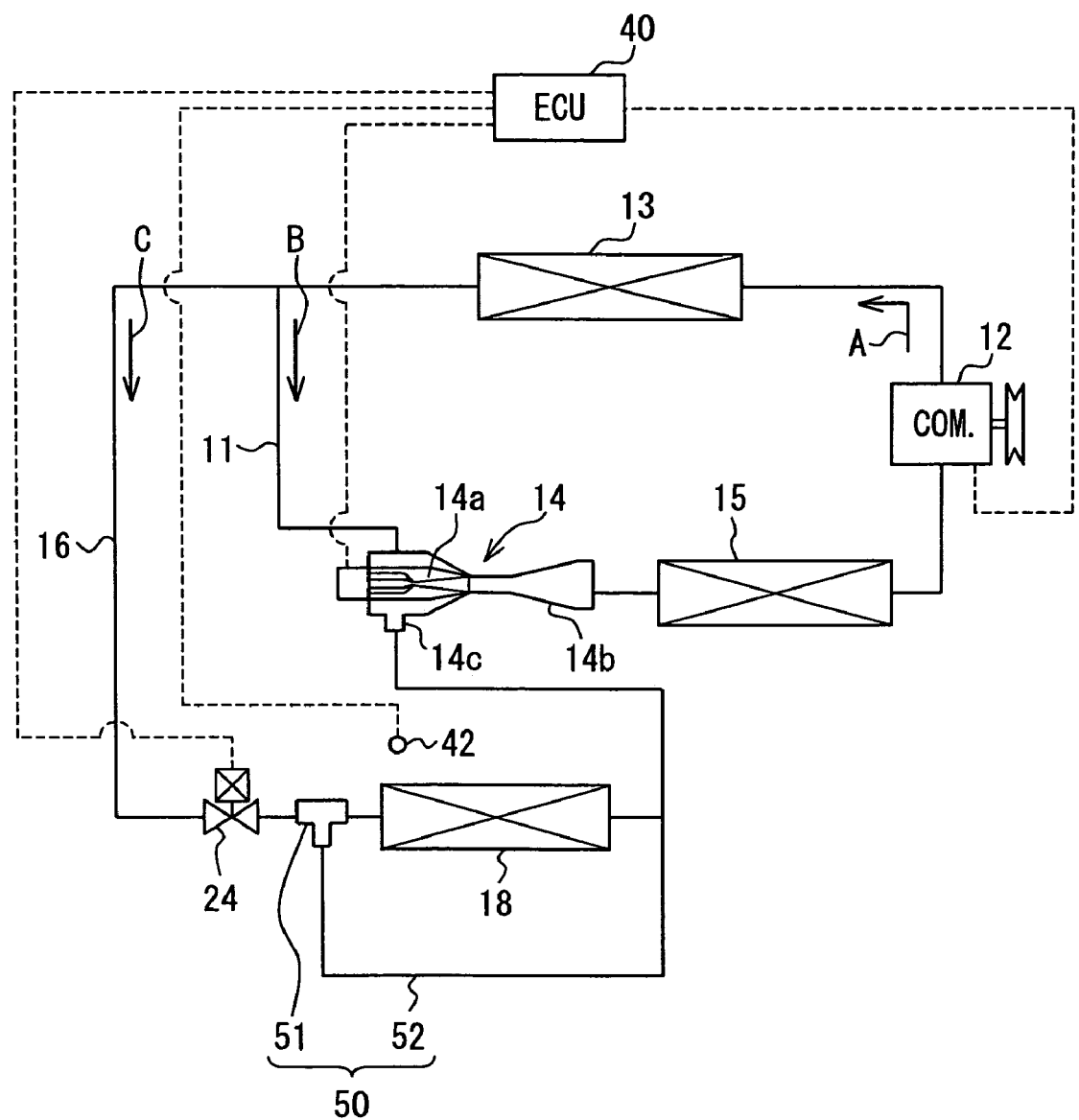
FIG. 3 is a schematic diagram showing an ejector cycle device according to a second embodiment of the present invention.

FIG. 3 shows an ejector cycle device of the second embodiment. In the second embodiment, components having structures and functions similar to those of the above-described first embodiment are indicated by the same reference numbers, and detail description thereof is omitted.

In the second embodiment, as shown in FIG. 3, a bypass circuit 50 is additionally provided as compared with the first embodiment. Specifically, a three-way switching valve 51 is provided between the throttle valve 24 and the second evaporator 18 to switch a passage. Furthermore, a bypass passage 52 is provided to be connected to the three-way switching valve 51 and an outlet side of the second evaporator 18, so that refrigerant from the throttle valve 24 flows through the bypass passage 52 while bypassing the second evaporator 18.

In the normal operation where both the first evaporator 15 and the second evaporator 18 are operated at the same time, the three-way switching valve 51 is controlled by the control device 40 to a first position to be communicated with the second evaporator 18. In this case, the refrigerant discharged from the ejector 14 flows into the first evaporator 15 so as to cool the interior (e.g., the first compartment) of the refrigerator. At the same time, refrigerant passing through the branch passage 16 is decompressed and expanded by the throttle valve 24, and flows into the second evaporator 18 so as to the interior (e.g., the second compartment) of the refrigerator. Gas refrigerant, evaporated in the second evaporator 18 by performing heat exchange, is drawn into the ejector 14 through the suction port 14c.

Next, defrosting operation of the second evaporator 18 will be now described.

The control device 40 determines whether or not the second evaporator 18 is frosted based on a temperature signal from the temperature sensor 42 disposed near the second evaporator 18 or the refrigerant temperature in the second evaporator 18. Alternatively, the control device 40 determines whether or not the second evaporator 18 is frosted, by determining whether or not the refrigerant temperature lower than a predetermined temperature is supplied to the second evaporator 18 for a predetermined time. When the control device 40 determines that the second evaporator 18 is frosted, the three-way valve 51 is controlled by the control device 40 to a second position so that the outlet of the throttle valve 24 communicates with the bypass passage 52. In this case, refrigerant flowing out of the throttle valve 24 flows to the outlet side of the second evaporator 18 through the three-way switching valve 51 and the bypass passage 52 without passing through the second evaporator 18, and is drawn into the ejector 14 through the suction port 14c.

At the same time, refrigerant radiated in the refrigerant radiator 13 is introduced into the nozzle portion 14a of the ejector 14 through the refrigerant circulating path 11, and is decompressed in the nozzle portion 14a to drawn the refrigerant from the bypass passage 52. Thereafter, the refrigerant from the nozzle portion 14a and the refrigerant drawn from the suction port 14c are mixed and pressurized in the mixing portion and the diffuser portion 14b, and flows into the first evaporator 15. Then, the evaporated gas refrigerant in the first evaporator 15 is drawn into the compressor 12 to be compressed, and is circulated again.

In the second embodiment, the throttle valve 24 controls a flow amount flowing through the branch passage 16 so as to adjust the refrigerant flow amount circulating in the refrigerant circulating path 11.

According to the second embodiment, the defrosting operation of the second evaporator 18 can be performed while the cooling operation in the first evaporator 15 can be continuously performed. In the second embodiment, a diaphragm-type flow adjusting valve for adjusting its throttle amount based on the refrigerant temperature at the outlet side of the second evaporator 18 can be used as the throttle valve 24, instead of an electromagnetic valve.

Third Embodiment

Figure 4:
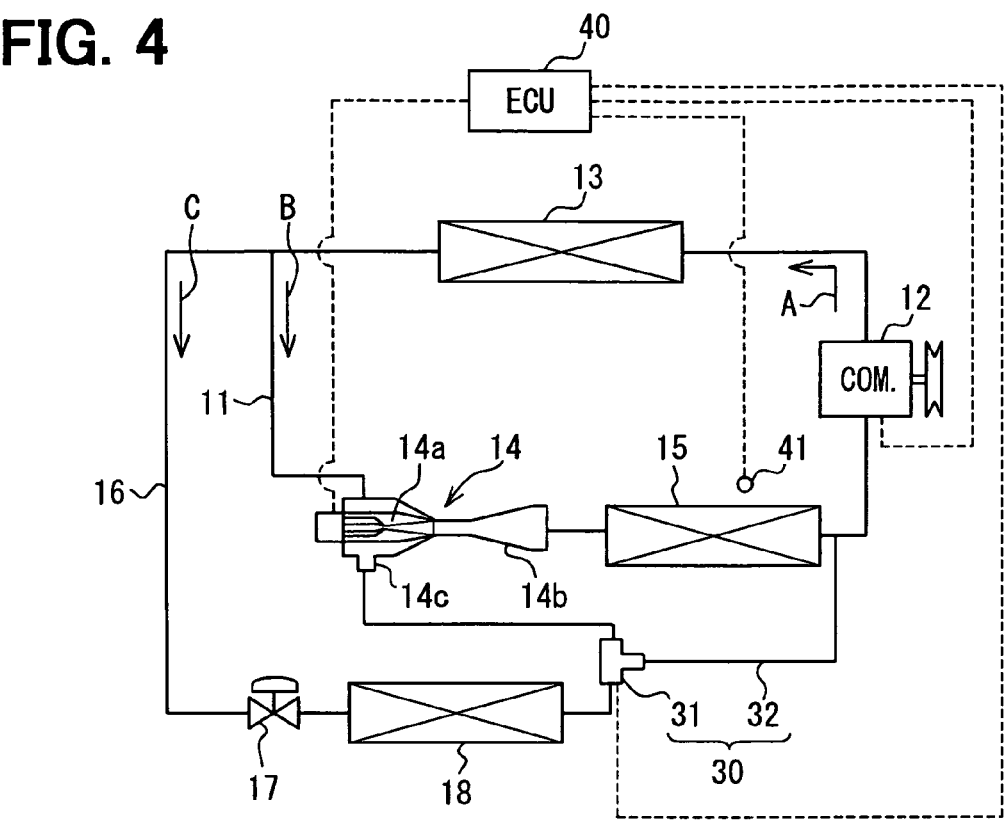
FIG. 4 is a schematic diagram showing an ejector cycle device according to a third embodiment of the present invention.

FIG. 4 shows an ejector cycle device according to the third embodiment. In the third embodiment, components having structures and functions similar to those of the above-described first embodiment are indicated by the same reference numbers, and detail description thereof is omitted.

In the third embodiment, as shown in FIG. 4, a throttle valve 17 for adjusting a flow amount of refrigerant flowing into the second evaporator 18 is provided upstream from the second evaporator 18, instead of the throttle valve 24 described in the above first embodiment. In this embodiment, the throttle valve 17 is a diaphragm-type flow adjusting valve, which adjusts mechanically its throttle amount based on a refrigerant temperature at the outlet side of the second evaporator 18. Furthermore, a bypass circuit 30 is provided. In this embodiment, the bypass circuit 30 includes an electromagnetic three-way switching valve 31 provided at a position between the suction port 14c of the ejector 14 and the outlet of the second evaporator 18, and a bypass passage 32 through which refrigerant from the second evaporator 18 flows while bypassing the first evaporator 15. The bypass passage 32 is connected to the three-way switching valve 31 and the refrigerant outlet side of the first evaporator 15.

Next, a normal operation of the ejector cycle device, in which both the first evaporator 15 and the second evaporator 18 are operated simultaneously, will be described. When the normal operation is set, the three-way switching valve 31 is controlled by the control device 40 to communicate the refrigerant outlet side of the second evaporator 18 to the suction port 14c of the ejector 14. When the compressor 12 is driven by a driving source such as an engine or an electrical motor, high-temperature and high-pressure refrigerant compressed by and discharged from the compressor 12 flows into the refrigerant radiator 13 as in the arrow A in FIG. 1. Heat of high-temperature refrigerant is radiated in the refrigerant radiator 13 outside of the refrigerator. Refrigerant flowing out from the refrigerant radiator 13 flows into the ejector 14 through the refrigerant circulating path 11, and flows into the second evaporator 18 through the branch passage 16.

The refrigerant flowing into the ejector 14 is decompressed in the nozzle portion 14a. That is, the nozzle portion 14a converts pressure energy of the high-pressure refrigerant to speed energy. Gas refrigerant from the second evaporator 18 is drawn into the mixing portion 14d of the ejector 14 by high-speed refrigerant jetted from the nozzle portion 14a.

The refrigerant jetted from the nozzle portion 14a and the refrigerant drawn from the suction port 14c are mixed in the mixing portion and flow into the diffuser portion 14b. Because the passage sectional area is enlarged in the diffuser portion 14b, the speed energy of the refrigerant is converted to the pressure energy in the diffuser portion 14b, so that the pressure of refrigerant is increased in the diffuser portion 14b. The pressurized refrigerant flowing out of the outlet port of the diffuser portion 14b flows into the first evaporator 15.

The refrigerant flowing into the first evaporator 15 is evaporated by absorbing heat from air flowing to the refrigerator. That is, refrigerant in the first evaporator 15 is heated and evaporated by air inside the refrigerator. The gas refrigerant from the first evaporator 15 is drawn into the refrigerant suction side of the compressor 12 and is compressed in the compressor 12 to be circulated in the refrigerant circulating path 11.

In addition, the refrigerant flowing into the branch passage 16 from the refrigerant radiator 13 is decompressed by the throttle valve 17, and is evaporated in the second evaporator 18 by absorbing heat from air flowing into the interior of the refrigerator. Therefore, the refrigerant is heated by air and is evaporated in the second evaporator 18. The gas refrigerant flowing out of the second evaporator 18 flows into the suction port 14c of the ejector 14 through the three-way switching valve 31. The gas refrigerant drawn into the suction port 14c of the ejector 14 from the second evaporator 18 is mixed with the refrigerant jetted by the nozzle portion 14a, and flows into the first evaporator 15 to be circulated.

In the normal operation of the ejector cycle device of the second embodiment, the temperature of refrigerant flowing to the second evaporator 18 can be set at a predetermined temperature by the throttle valve 17. Because a pressure difference is generated between the first evaporator 15 and the second evaporator 18 due to the pressurization in the diffuser portion 14b of the ejector 14, a temperature difference is set between the first evaporator 15 and the second evaporator 18. Therefore, the refrigerant temperature in the first evaporator 15 can be set based on the refrigerant temperature in the second evaporator 18 and the temperature difference between the first and second evaporators 15 and 18.

Next, defrosting operation of the first evaporator 15 will be now described.

Figure 2:
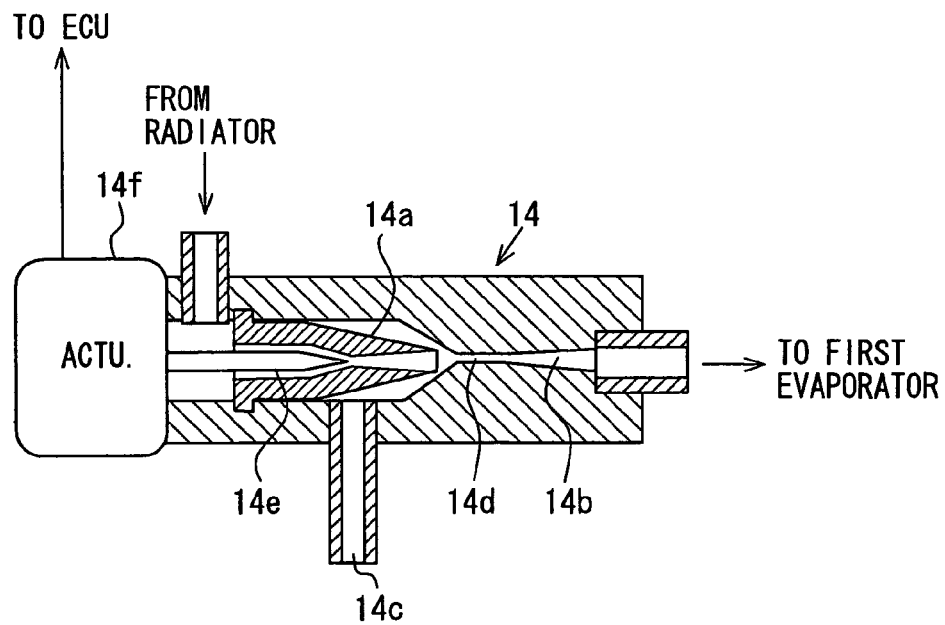
FIG. 2 is a schematic sectional view showing an example of an ejector used for the ejector cycle device of the first embodiment.

The control device 40 determines whether or not the first evaporator 15 is frosted based on a temperature signal from a temperature sensor 41 disposed near the first evaporator 15 or a refrigerant temperature in the first evaporator 15. Alternatively, the control device 40 determines whether or not the first evaporator 15 is frosted, by determining whether or not the refrigerant temperature lower than a predetermined temperature is supplied to the first evaporator 15 for a predetermined time. When the control device 40 determines that the first evaporator 15 is frosted, the actuator 14f (see FIG. 2) is controlled by the control device 40 to move the needle valve 14a, so that the needle valve 14e closes the jet port of the nozzle portion 14a. Therefore, the refrigerant passage, through which refrigerant from the refrigerant radiator 13 flows to the nozzle portion 14a of the ejector 14, is closed, thereby preventing a flow of the refrigerant from the refrigerant radiator 13 to the first evaporator 15 through the nozzle portion 14a of the ejector 14.

At the same time, the three-way valve 31 is controlled by the control device 40 to a second position so that the outlet of the second evaporator 18 communicates with the bypass passage 32. In this case, refrigerant flowing out of the throttle valve 17 flows to the outlet side of the second evaporator 15, through the second evaporator 18, the three-way switching valve 31 and the bypass passage 32 without passing through the ejector 14 and the first evaporator 15. Thereafter, the refrigerant from the bypass passage 32 is drawn to the compressor 12.

Accordingly, in the defrosting operation, the refrigerant circulates in this order of the compressor 12, the refrigerant radiator 13, the branch passage 16, the throttle valve 17, the second evaporator 18 and the bypass passage 32. The throttle open degree of the throttle valve 17 is adjusted so that the cooling capacity of the second evaporator 18 can be adjusted at a suitable value. Furthermore, the refrigerant state at the outlet side of the second evaporator 18 can be adjusted by the throttle valve 17, thereby preventing liquid refrigerant from flowing into the compressor 12.

In the third embodiment, the defrosting operation of the first evaporator 15 can be performed by stopping the flow of refrigerant to the first evaporator 15, while refrigerant can be continuously supplied to the second evaporator 18. Accordingly, even during the defrosting operation of the first evaporator 15, the cooling operation of the second evaporator 18 can be continuously performed.

In the ejector cycle device of the third embodiment, when an electromagnetic flow adjusting valve is used as the throttle valve 17, it is possible to perform the defrosting operation of the second evaporator 18, while cooling operation of the first evaporator 15 can be performed. When the defrosting operation of the second evaporator 18 is performed, the throttle valve 17 closes its throttle passage so as to stop the flow of refrigerant to the second evaporator 18. As a result, all refrigerant from the refrigerant radiator 13 flows into the ejector 14, and is decompressed in the nozzle portion 14a of the ejector 14. In this case, the nozzle portion 14a is used as a general decompression valve. The decompressed refrigerant from the nozzle portion 14a of the ejector 14 flows into the first evaporator 15 and is evaporated.

Accordingly, in the third embodiment, any one of the first evaporator 15 and the second evaporator 18 can be defrosted while the other one of the first evaporator 15 and the second evaporator 18 has a cooling function.

Fourth Embodiment

Figure 5:
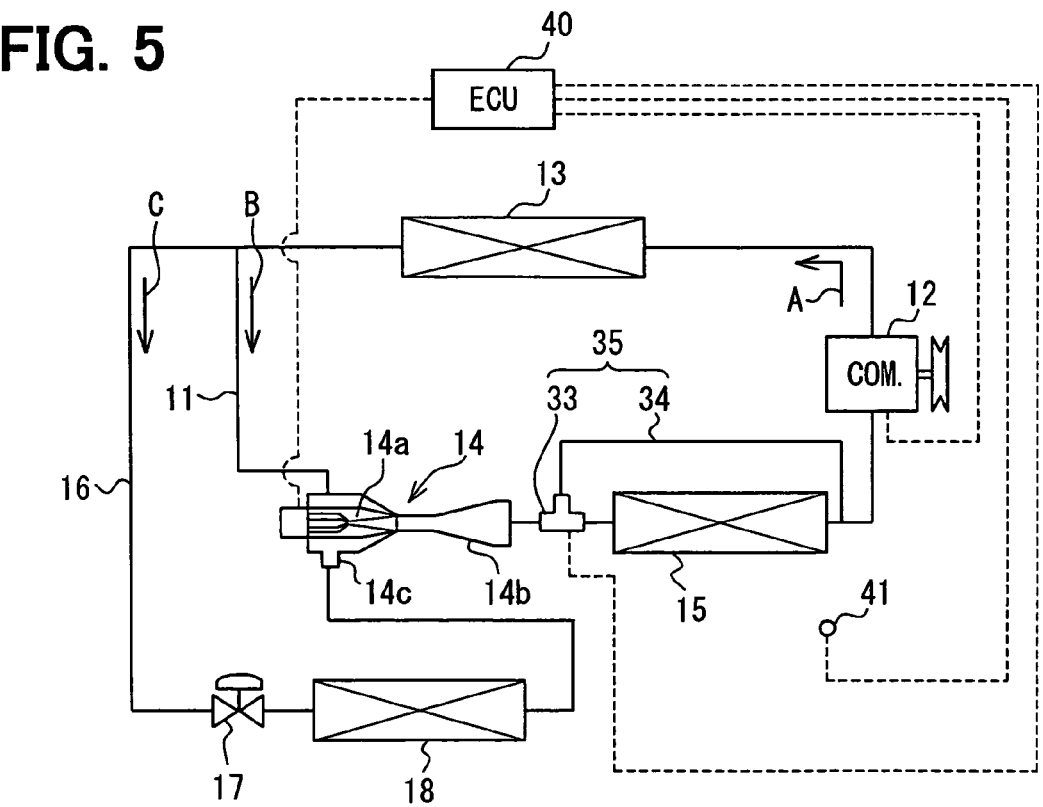
FIG. 5 is a schematic diagram showing an ejector cycle device according to a fourth embodiment of the present invention.

FIG. 5 shows an ejector cycle device according to the fourth embodiment. In the fourth embodiment, components having structures and functions similar to those of the above-described first and third embodiments are indicated by the same reference numbers, and detail description thereof is omitted.

In the fourth embodiment, as shown in FIG. 5, the throttle valve 17 for adjusting a flow amount of refrigerant flowing into the second evaporator 18 is provided upstream from the second evaporator 18. In this embodiment, the throttle valve 17 can be a diaphragm-type flow adjusting valve, which adjusts mechanically its throttle amount based on the refrigerant temperature at the outlet side of the second evaporator 18. Furthermore, a bypass circuit 35 is provided, instead of the bypass circuit 30 shown in FIG. 4. In this embodiment, the bypass circuit 35 includes an electromagnetic three-way switching valve 33 provided at a position between the discharge port of the ejector 14 and the first evaporator 15, and a bypass passage 34 through which refrigerant flows while bypassing the first evaporator 15. The bypass passage 34 is connected to the three-way switching valve 31 and the refrigerant outlet side of the first evaporator 15, so that refrigerant from the ejector 14 bypasses the first evaporator 15 through the bypass passage 34.

Next, a normal operation of the ejector cycle device, in which both the first evaporator 15 and the second evaporator 18 are operated simultaneously, will be described. When the normal operation is set, the three-way switching valve 33 is controlled by the control device 40 to communicate the discharge port of the ejector 14 with the inlet portion of the first evaporator 15.

Therefore, in the normal operation, refrigerant flowing out from the refrigerant radiator 13 flows into the nozzle portion 14a of the ejector 14 through the refrigerant circulating path 11, and flows into the first evaporator 15 through the three-way switching valve 33.

In the normal operation, the refrigerant from the refrigerant radiator 13 also flows into the throttle valve 17 and is decompressed in the throttle valve 17. The decompressed refrigerant from the throttle valve 17 is evaporated in the second evaporator 18, and cooling function can be obtained in the second evaporator 18.

The refrigerant jetted from the nozzle portion 14a and the refrigerant drawn from the suction port 14c are mixed in the mixing portion and flow into the diffuser portion 14b. Because the passage sectional area is enlarged in the diffuser portion 14b, the speed energy of the refrigerant is converted to the pressure energy in the diffuser portion 14b, so that the pressure of refrigerant is increased in the diffuser portion 14b. The pressurized refrigerant flowing out of the outlet port of the diffuser portion 14b flows into the first evaporator 15. The refrigerant is evaporated in the first evaporator 15 so that cooling function can be obtained in the first evaporator 15. The refrigerant flowing out of the first evaporator 15 is drawn to the compressor 12, and the refrigerant circulation in the normal operation is repeated.

In the normal operation of the ejector cycle device of the fourth embodiment, the temperature of refrigerant flowing to the second evaporator 18 is set at a predetermined temperature by the throttle valve 17. Because a pressure difference is generated between the first evaporator 15 and the second evaporator 18 due to the pressurization in the diffuser portion 14b of the ejector 14, a temperature difference is set between the first evaporator 15 and the second evaporator 18. Therefore, the refrigerant temperature in the first evaporator 15 can be set based on the refrigerant temperature in the second evaporator 18 and the temperature difference between the first and second evaporators 15 and 18.

Next, defrosting operation of the first evaporator 15 will be now described.

The control device 40 determines whether or not the first evaporator 15 is frosted based on a temperature signal from the temperature sensor 41 disposed near the first evaporator 15 or a refrigerant temperature in the first evaporator 15. Alternatively, the control device 40 determines whether or not the first evaporator 15 is frosted, by determining whether or not the refrigerant temperature lower than a predetermined temperature is supplied to the first evaporator 15 for a predetermined time. When the control device 40 determines that the first evaporator 15 is frosted, the three-way switching valve 33 is controlled by the control device 40 so that the discharge port of the ejector 14 communicates with the bypass passage 34 through the three-way switching valve 33. In this case, refrigerant flowing out of the discharge port of the ejector 14 flows to the outlet side of the first evaporator 15 through the three-way switching valve 33 and the bypass passage 34, without passing through the first evaporator 15. Thereafter, the refrigerant from the bypass passage 34 is drawn to the compressor 12.

Accordingly, in the defrosting operation, the refrigerant circulates in the refrigerant circulating path 11 in this order of the compressor 12, the refrigerant radiator 13, the nozzle portion 14a and the diffuser portion 14b of ejector 14, the three-way switching valve 33 and the bypass passage 34. Because the refrigerant discharged from the ejector 14 bypasses the first evaporator 15, the defrosting operation of the first evaporator 15 can be performed.

At the same time, in the defrosting operation, the refrigerant flowing out of the refrigerant radiator 13 flows through the branch passage 16, is decompressed in the throttle valve 17, and flows into the second evaporator 18. The gas refrigerant evaporated in the second evaporator 18 by heat exchange is drawn into the ejector 14 from the suction port 14c, and is mixed with the refrigerant jetted from the nozzle portion 14a.

In the fourth embodiment, when the defrosting operation of the first evaporator 15 is performed, the discharge port of the ejector 14 communicates with the bypass passage 34 by the three-way switching valve 33, so as to stop the flow of refrigerant to the first evaporator 15. Furthermore, the refrigerant discharged from the refrigerant radiator 13 flows into the second evaporator 18 while flowing into the ejector 14. The refrigerant flowing out of the second evaporator 18 is drawn into the ejector 14 through the suction port 14c, and is mixed with the refrigerant jetted from the nozzle portion 14a. Then, the refrigerant is discharged from the discharge port of the ejector 14, and is drawn to the compressor 12 through the three-way switching valve 33 and the bypass passage 34. The super-heating degree to be drawn to the compressor 12 can be controlled by the ejector 14 or the throttle valve 17, thereby preventing liquid refrigerant from flowing into the compressor 12.

In the fourth embodiment, during the defrosting operation of the first evaporator 15, the throttle open degree of the nozzle portion 14a of the ejector 14 is controlled so that refrigerant is decompressed in the nozzle portion 14a similarly to the normal operation. However, during the defrosting operation of the first evaporator 15, the jet port of the nozzle portion 14a can be fully closed by the needle valve 14e. In this case, because no refrigerant is jetted from the nozzle portion 14a, refrigerant from the second evaporator 18 passes through the space around the nozzle portion 14a, the mixing portion 14d and the diffuser portion 14b in the ejector 14 only using the suction force of the compressor 12.

In the ejector cycle device of the fourth embodiment, when an electromagnetic flow adjusting valve is used as the throttle valve 17, it is possible to perform the defrosting operation of the second evaporator 18, while cooling operation of the first evaporator 15 can be performed. When the defrosting operation of the second evaporator 18 is performed, the throttle valve 17 closes its throttle passage so as to stop the flow of refrigerant to the second evaporator 18. As a result, in the defrosting operation of the second evaporator 18, all refrigerant from the refrigerant radiator 13 flows into the ejector 14, and is decompressed in the nozzle portion 14a of the ejector 14. In this case, the nozzle portion 14a is used as a general decompression valve. The decompressed refrigerant from the nozzle portion 14a of the ejector 14 flows into the first evaporator 15 and is evaporated.

Accordingly, in the fourth embodiment, any one of the first evaporator 15 and the second evaporator 18 can be defrosted while the other one of the first evaporator 15 and the second evaporator 18 has a cooling function.

Fifth Embodiment

Figure 6:
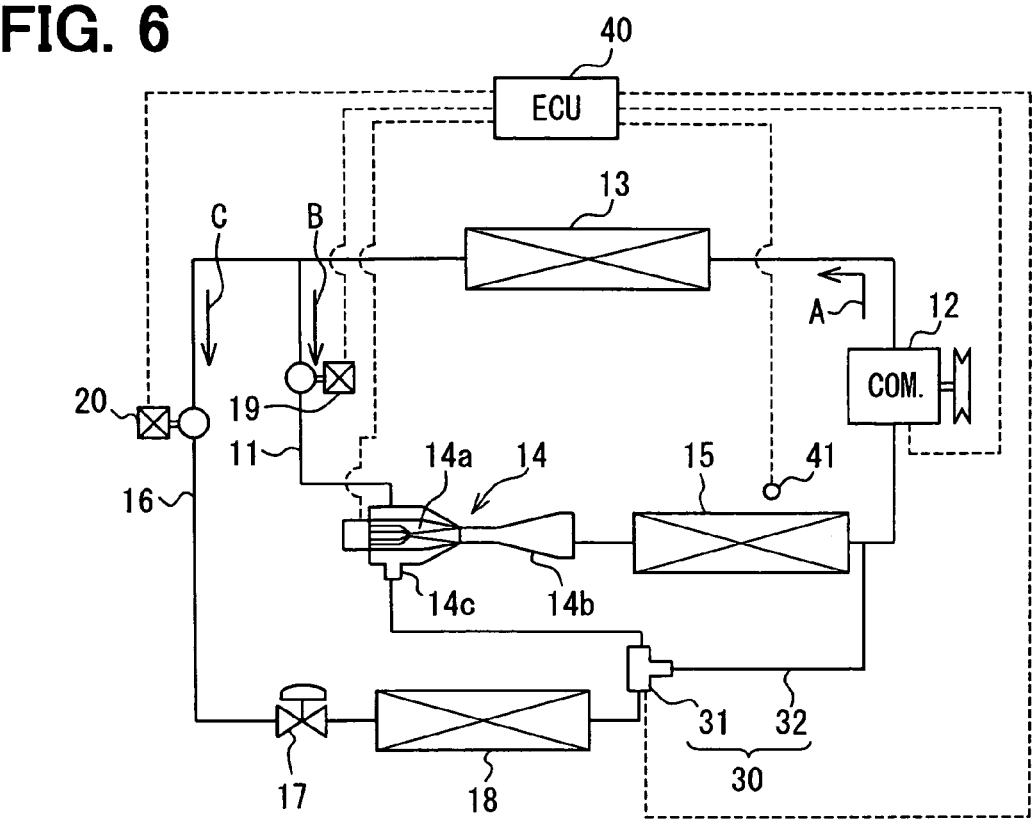
FIG. 6 is a schematic diagram showing an ejector cycle device according to a fifth embodiment of the present invention.

FIG. 6 shows an ejector cycle device according to the fifth embodiment. In the ejector cycle device of the fifth embodiment, a first electromagnetic valve 19 for opening and closing the refrigerant circulating path 11 is provided at an upstream position of the ejector 14, and a second electromagnetic valve 20 for opening and closing the branch passage 16 is provided at an upstream position of the throttle valve 17. In the fifth embodiment, the other parts are similar to those of the above-described third embodiment.

When both the electromagnetic valves 19, 20 are opened, the operation of the ejector cycle device is similar to that of the above-described third embodiment.

When the first electromagnetic valve 19 is opened and the second electromagnetic valve 20 is closed, all refrigerant flows into the refrigerant circulating path 11. In contrast, when the first electromagnetic valve 19 is closed and the second electromagnetic valve 20 is opened, all refrigerant flows into the branch passage 16. Accordingly, any one of the first evaporator 15 and the second evaporator 18 can be operated simply by the switching operation of the first and second electromagnetic valves 19, 20. When all the refrigerant flows through the second evaporator 18 in the branch passage 16, lubrication oil staying in the second evaporator 18 can be returned to the compressor 12.

In the above-described third embodiment, during the defrosting operation of the first evaporator 15, the jet port of the nozzle portion 14a of the ejector 14 is closed by the needle valve 14e. However, instead of this operation, the refrigerant circulating path 11 can be shut by using the first electromagnetic valve 19. In this case, a fixed nozzle portion can be used instead of the variable nozzle portion 14a.

Furthermore, during the defrosting operation of the second evaporator 18, the second electromagnetic valve 20 can be closed to stop the flow of refrigerant to the second evaporator 18.

In the fifth embodiment, any one of the first and second electromagnetic valves 19 and 20 can be provided. Even in this case, the other parts can be made similarly to the above-described third embodiment.

Sixth Embodiment

Figure 7:
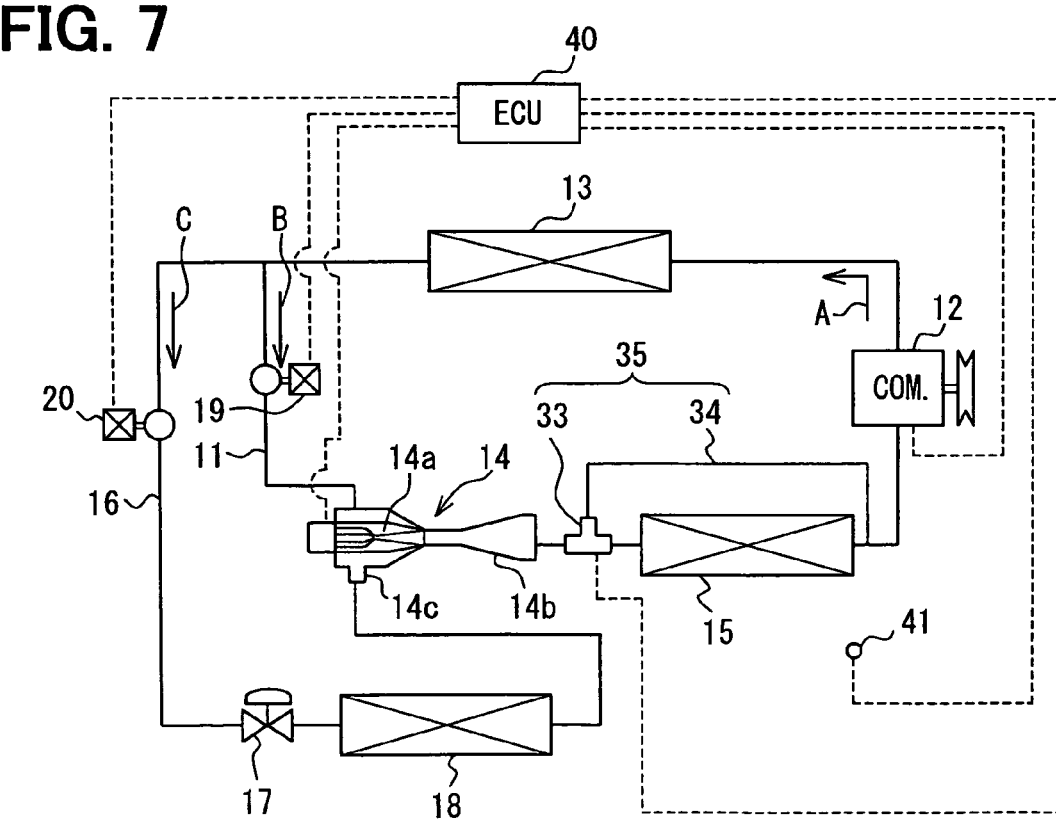
FIG. 7 is a schematic diagram showing an ejector cycle device according to a sixth embodiment of the present invention.

FIG. 7 shows an ejector cycle device according to the sixth embodiment. In the ejector cycle device of the sixth embodiment, a first electromagnetic valve 19 for opening and closing the refrigerant circulating path 11 is provided at an upstream position of the ejector 14, and a second electromagnetic valve 20 for opening and closing the branch passage 16 is provided at an upstream position of the throttle valve 17. In the sixth embodiment, the other parts can be similar to those of the above-described fourth embodiment.

When both the electromagnetic valves 19, 20 are opened, the operation of the ejector cycle device is similar to that of the above-described fourth embodiment.

When the first electromagnetic valve 19 is opened and the second electromagnetic valve 20 is closed, all refrigerant flows into the refrigerant circulating path 11. In contrast, when the first electromagnetic valve 19 is closed and the second electromagnetic valve 20 is opened, all refrigerant flows into the branch passage 16. Accordingly, any one of the first evaporator 15 and the second evaporator 18 can be operated simply by the switching operation of the first and second electromagnetic valves 19, 20. When all of the refrigerant flows through the second evaporator 18 in the branch passage 16, lubrication oil staying in the second evaporator 18 can be returned to the compressor 12.

In the sixth embodiment, any one of the first and second electromagnetic valves 19 and 20 may be provided.

Seventh Embodiment

Figure 8:
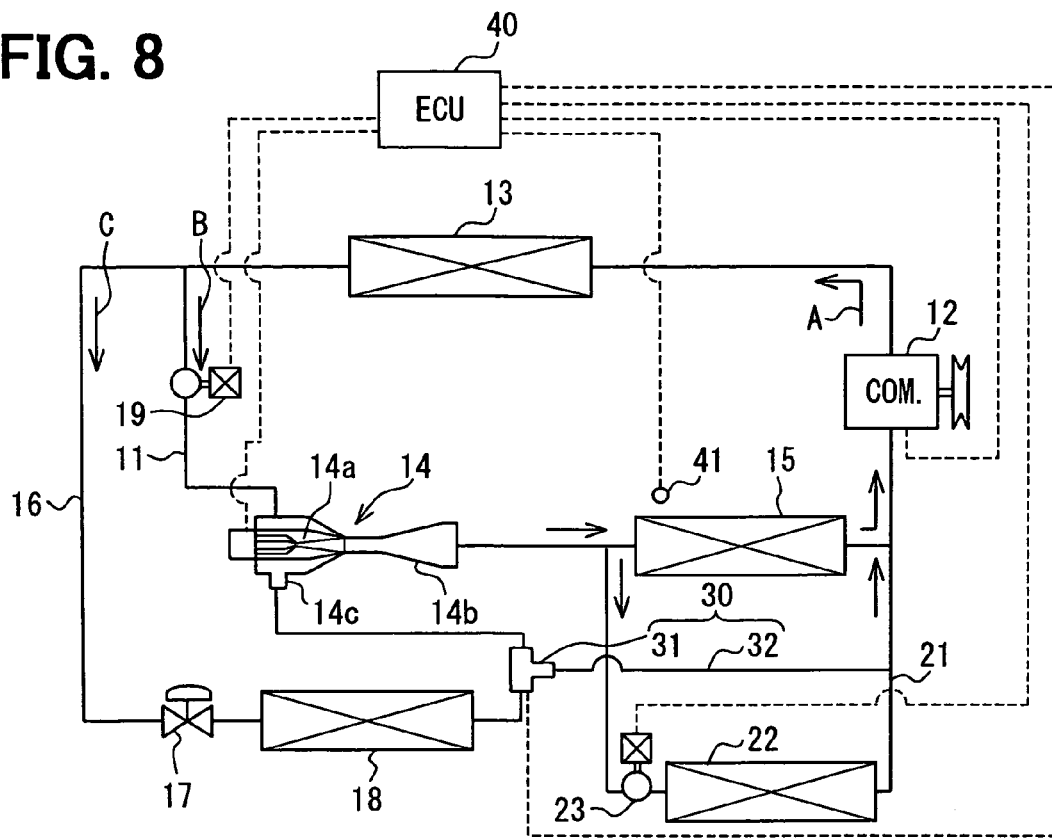
FIG. 8 is a schematic diagram showing an ejector cycle device according to a seventh embodiment of the present invention.

FIG. 8 shows an ejector cycle device according to the seventh embodiment. In the ejector cycle device of the seventh embodiment, the branch passage 16 is used as a first branch passage 16, and a second branch passage 21 is additionally provided compared with the ejector cycle device of the above-described third embodiment. The second branch passage 21 is provided to be connected to a position between the discharge port of the ejector 14 and the first evaporator 15, and a position between the first evaporator 15 and the compressor 12. Furthermore, a third evaporator 22 is arranged in the second branch passage 21, and an electromagnetic valve 19 is located in the refrigerant circulating path 11 at a position upstream from the ejector 14.

In the seventh embodiment, the third evaporator 22 is provided to have a cooling function in addition to the first and second evaporators 15, 18. In the seventh embodiment, all the evaporators 15, 18 and 22 can be used for cooling same subject (e.g., interior of the refrigerator) or can be used for cooling plural different cooling subjects. Furthermore, the evaporators 15, 18 and 22 can be used for cooling different spaces in the refrigerator.

In the seventh embodiment, the refrigerant inlet and the refrigerant outlet of the third evaporator 22 are positioned at the same positions as the refrigerant inlet and the refrigerant outlet of the first evaporator 15, respectively. Therefore, the refrigerant pressure in the third evaporator 22 is approximately equal to that of the first evaporator 15. Accordingly, in the third evaporator 22, cooling capacity approximately similar to the first evaporator 15 can be obtained.

An electromagnetic valve 23 is provided upstream from the third evaporator 22 in the second branch passage 21 to switch a flow of refrigerant into the third evaporator 22 in the second branch passage 21. When the cooling function of the third evaporator 22 is unnecessary, the electromagnetic valve 23 is closed so as to stop the cooling operation in the third evaporator 22.

When the defrosting operation of the first evaporator 15, described in the third embodiment, is performed, the three-way switching valve 31 is operated so that the refrigerant outlet of the second evaporator 18 communicates with the bypass passage 32. At this time, by closing the electromagnetic valve 23, it can prevent a reverse flow from the bypass passage 32 to the third evaporator 22.

In addition, when the electromagnetic valve 19 is closed, all of the refrigerant flows through the second evaporator 18 in the branch passage 16. In this case, lubrication oil staying in the second evaporator 18 can be effectively returned to the compressor 12.

In the ejector cycle device, the other parts can be made similarly to those of the above-described third embodiment.

Eighth Embodiment

Figure 9:
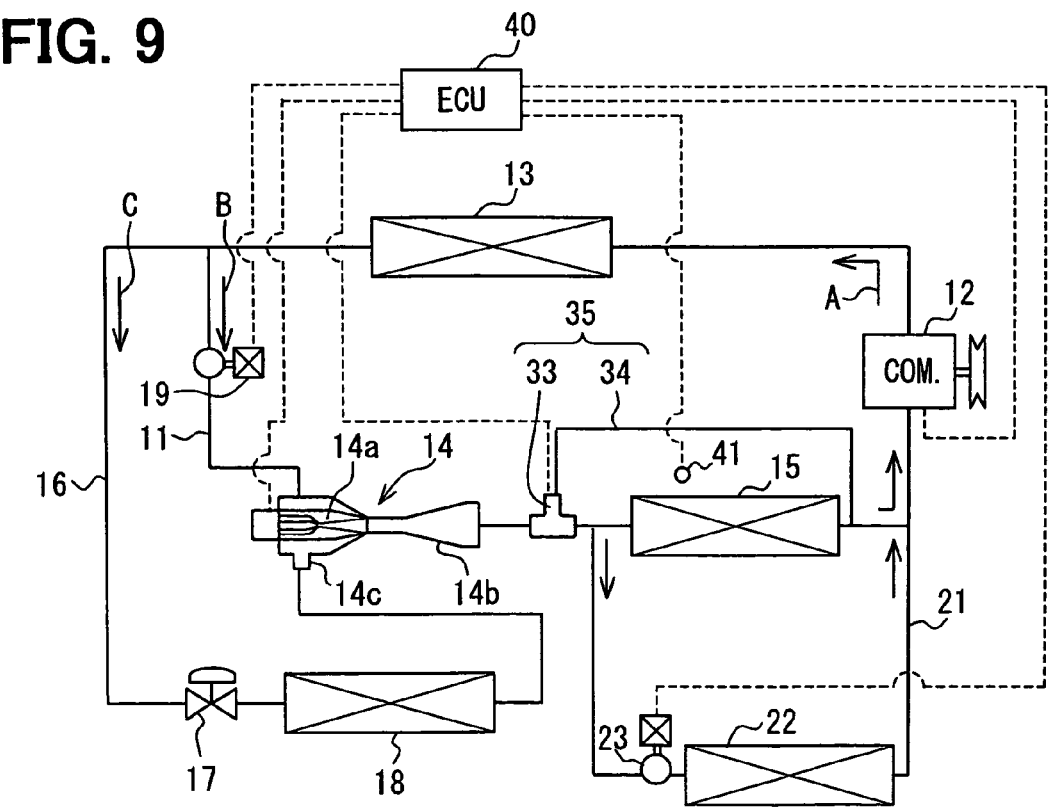
FIG. 9 is a schematic diagram showing an ejector cycle device according to an eighth embodiment of the present invention.

FIG. 9 shows an ejector cycle device of the eighth embodiment. In the ejector cycle device of the eighth embodiment, the structure of the above-described seventh embodiment, regarding the second branch passage 21, the third evaporator 22 and the electromagnetic valve 23, is combined with the ejector cycle device of the fourth embodiment. Therefore, the operation of the third evaporator 22 and the electromagnetic valve 23 is similarly to that of the above-described seventh embodiment. Furthermore, similarly to the above-described seventh embodiment, the electromagnetic valve 19 can be provided.

In the eighth embodiment, the structure of the bypass circuit 35 is similar to that of the above-described fourth embodiment. Accordingly, even during the defrosting operation of the first evaporator 15, the second evaporator 18 can be operated to have the cooling function.

Ninth Embodiment

Figure 10:
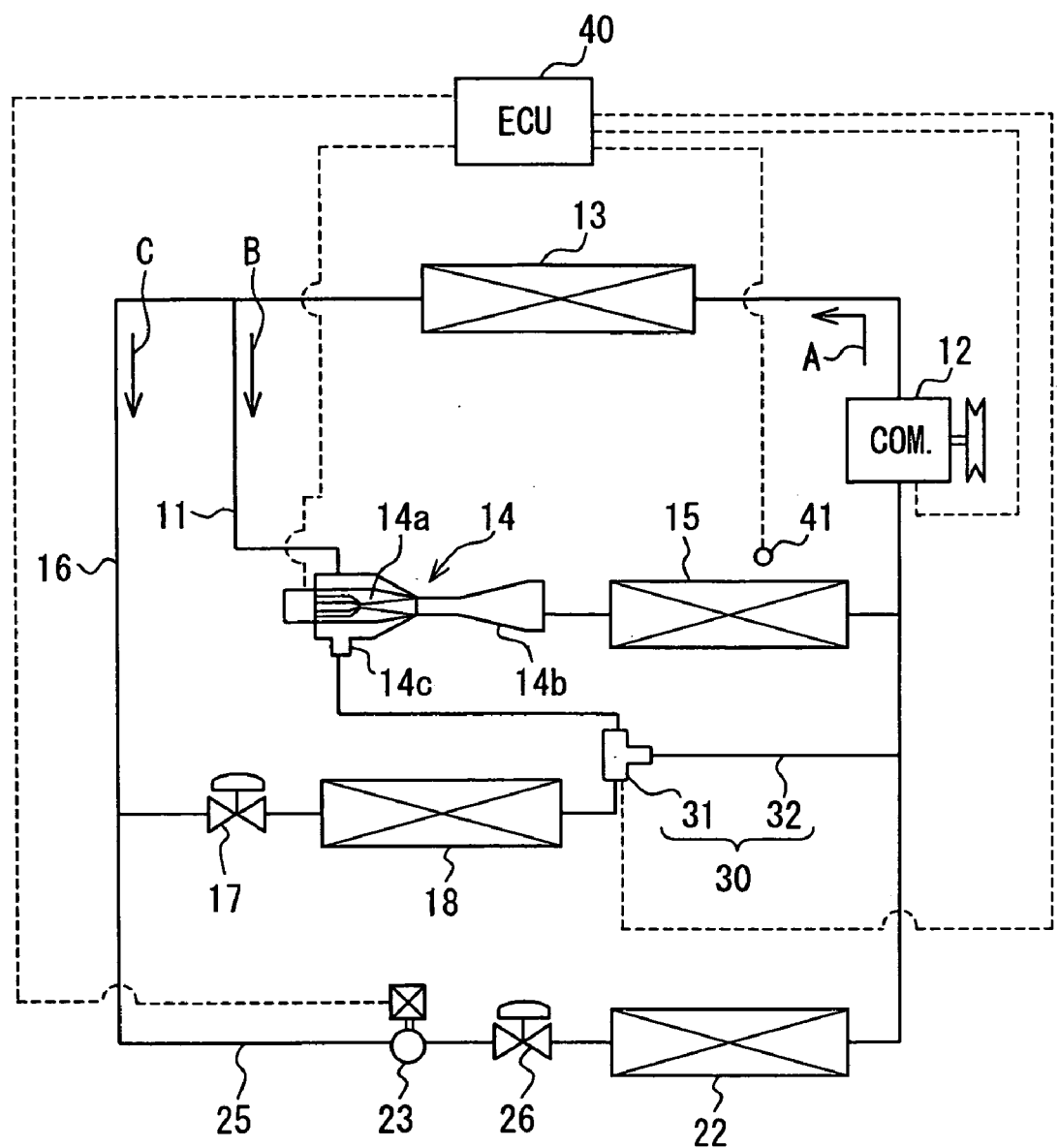
FIG. 10 is a schematic diagram showing an ejector cycle device according to a ninth embodiment of the present invention.

FIG. 10 shows an ejector cycle device of the ninth embodiment. In the ejector cycle device of the ninth embodiment, the branch passage 16 of the above-described third embodiment is used as a first branch passage 16, and a second branch passage 25 is connected to an upstream position of the throttle valve 17 in the first branch passage 16 and to a position between the first evaporator 15 and the compressor 12 in the cycle structure of the ejector cycle device of the third embodiment.

Furthermore, as shown in FIG. 10, in the second branch passage 25, an electromagnetic valve 23 and a throttle valve 26 are arranged, and a third evaporator 22 is provided downstream from the throttle valve 26. The electromagnetic valve 23 is provided to open and close the second branch passage 25, and the throttle valve 26 is provided to adjust a flow amount of refrigerant and to decompress the refrigerant flowing into the third evaporator 22.

In this embodiment, the bypass passage 32 connected to the three-way switching valve 31 is connected to the second branch passage 23, to be joined to the refrigerant outlet side of the first evaporator 15.

In the ninth embodiment, when the electromagnetic valve 23 is closed, the operation of the ejector cycle device is the same as that of the above-described third embodiment. In contrast, when the electromagnetic valve 23 is opened, refrigerant from the first branch passage 16 can be introduced into the third evaporator 22 after being decompressed in the throttle valve 26, even in the normal operation or the defrosting operation of the ejector cycle device of the third embodiment. Accordingly, plural different cooling subjects can be respectively independently cooled by using the first, second and third evaporators 15, 18, 22.

Tenth Embodiment

Figure 11:
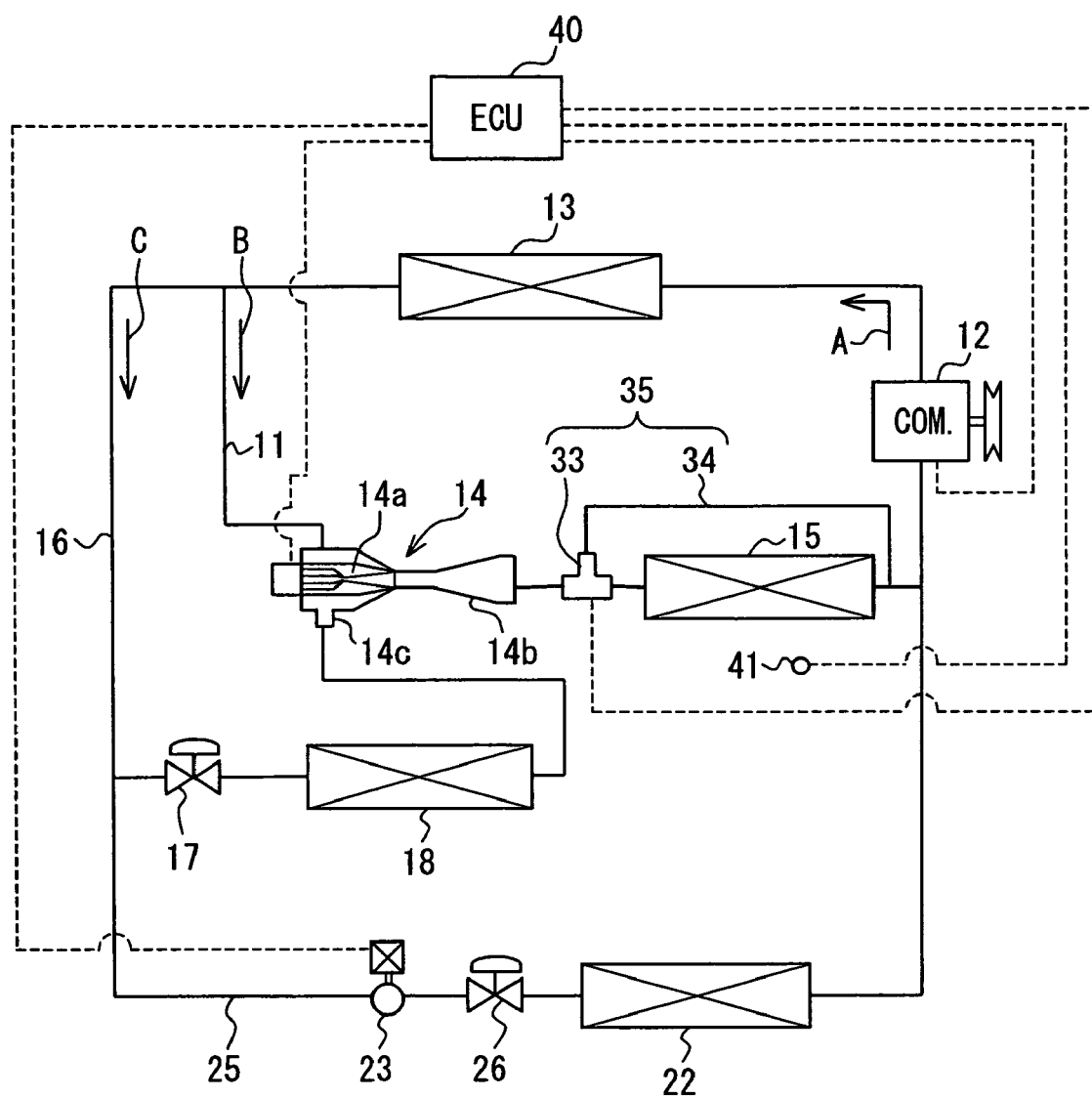
FIG. 11 is a schematic diagram showing an ejector cycle device according to a tenth embodiment of the present invention.
Figure 12:
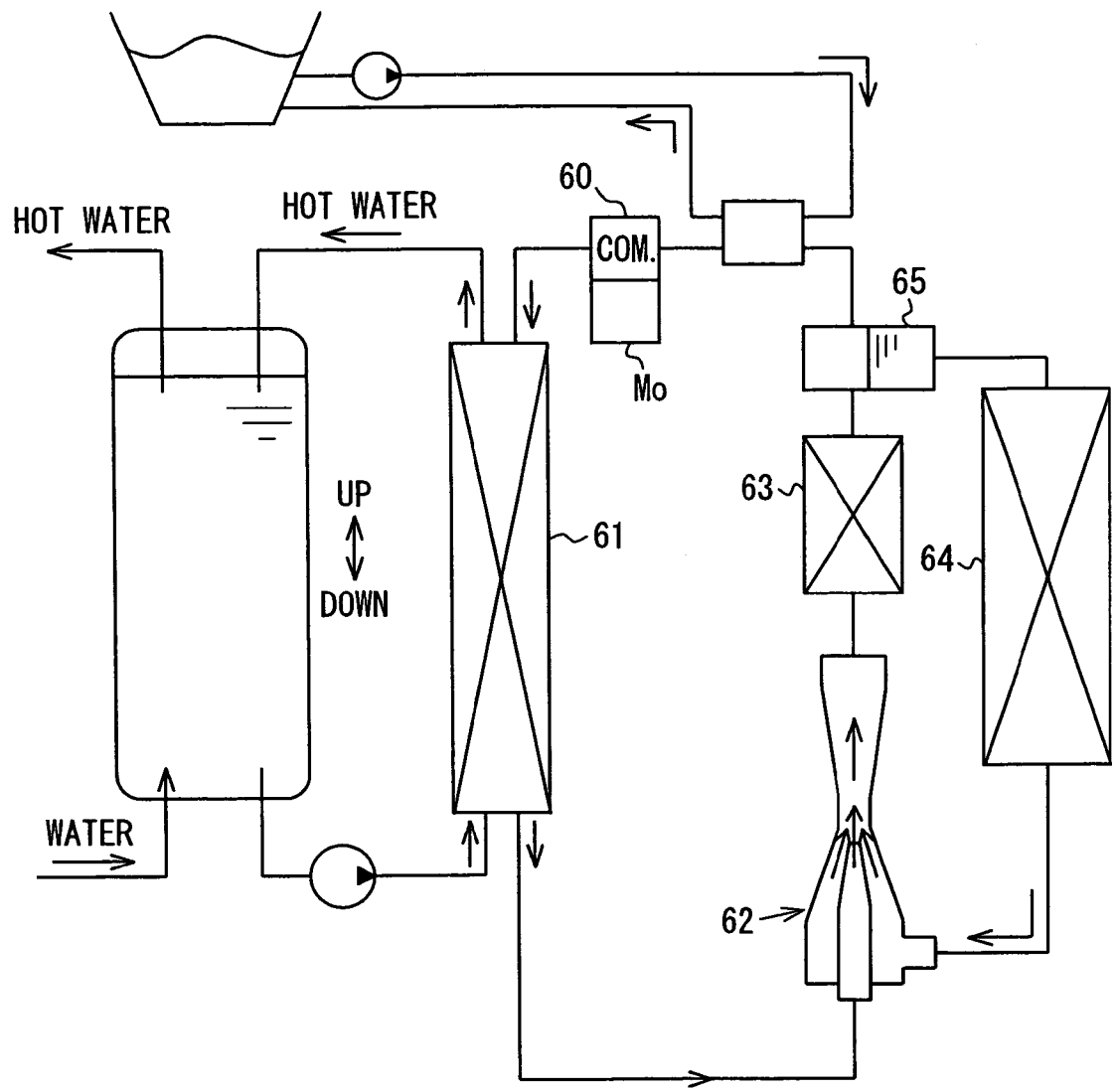
FIG. 12 is a schematic diagram showing a conventional ejector cycle device.

FIG. 11 shows an ejector cycle device of the tenth embodiment. In the ejector cycle device of the tenth embodiment, the structure of the second branch passage 25 of the above-ninth embodiment is combined with the structure of the bypass circuit 35 of the above-described fourth embodiment.

Accordingly, when the electromagnetic valve 23 is closed, the operation of the ejector cycle device is the same as that of the above-described fourth embodiment. In contrast, when the electromagnetic valve 23 is opened, refrigerant from the refrigerant radiator 13 can be introduced into the third evaporator 22 after being decompressed in the throttle valve 26, even in the normal operation or the defrosting operation of the ejector cycle device of the fourth embodiment. Accordingly, plural different cooling subjects (e.g., three different cooling subjects) can be respectively independently cooled by using the first, second and third evaporators 15, 18, 22.

Other Embodiment

Although the present invention has been fully described in connection with the preferred embodiments thereof with reference to the accompanying drawings, it is to be noted that various changes and modifications will become apparent to those skilled in the art.

For example, in the above-described embodiments, the ejector cycle device is typically used for a refrigerator having plural compartments, for example. However, the evaporators 13, 15, 22 can be used for cooling plural cooling subjects, e.g., different spaces in a passenger compartment of a vehicle and an interior of a refrigerator mounted on the vehicle.

Alternatively, the ejector cycle device can be used for a heat pump cycle device used for a water heater for heating water. Furthermore, the ejector cycle device can be used for a vapor-compression ejector cycle device for the other use.

In the ejector cycle device, the kind of refrigerant is not limited. For example, as the refrigerant, chlorofluorocarbon (CFC), HC alternatives for chlorofluorocarbon, carbon dioxide, etc., can be suitably used.

The ejector cycle device in each of the above-described first to sixth embodiments is provided with the two evaporators 15, 18 having different cooling functions. However, plural evaporators more than two, having different cooling capacities, can be provided, similarly to the above-described seventh to tenth embodiments.

In the above-described embodiments, the ejector cycle device is not provided with a gas-liquid separator. However, a gas-liquid separator can be provided at a refrigerant suction side of the compressor 12, downstream from the first evaporator 15. In this case, the gas-liquid separator is used as an accumulator in which a surplus refrigerant is stored as liquid refrigerant while gas refrigerant is supplied to the compressor 12.

In the above-described first to tenth embodiments, the throttle valve 17, 24 is provided upstream of the second evaporator 18. However, a fixed throttle such as a capillary tube can be used, for example. Furthermore, a general decompression valve having a mechanism for adjusting a throttle open degree based on a super-heating degree of the evaporator can be used as the throttle valve 17, 24.

In the above-described embodiments, the throttle open degree of the nozzle portion 14a is variably controlled by using the needle valve 14e. However, an ejector having a fixed open degree without having a flow adjusting function can be used in accordance with a using condition.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. An ejector cycle device comprising:

a compressor for compressing refrigerant;

a refrigerant radiator disposed to radiate heat of refrigerant discharged from the compressor;

an ejector including a nozzle portion which decompresses refrigerant flowing out of the refrigerant radiator by converting pressure energy of the refrigerant to speed energy thereof, the ejector having a refrigerant suction port from which refrigerant is drawn by a refrigerant stream jetted from the nozzle portion;

a first evaporator for evaporating refrigerant flowing out of the ejector, the first evaporator having a refrigerant outlet coupled to a refrigerant suction side of the compressor;

a branch passage, which is branched from a position between a refrigerant downstream side of the refrigerant radiator and the ejector, and is connected to the refrigerant suction port of the ejector;

a throttle member disposed in the branch passage to decompress refrigerant and adjust a flow amount of refrigerant;

a second evaporator disposed in the branch passage between the throttle member and the refrigerant suction port; and a defrosting means which is provided to perform a defrosting operation of one of the first and second evaporators while the other one of the first and second evaporators is operated to have a cooling function.

2. The ejector cycle device according to claim 1, wherein:
the defrosting means is a shutting means provided in the throttle member; and
the shutting means shuts a flow of refrigerant to the second evaporator when the defrosting operation of the second evaporator is performed.

3. The ejector cycle device according to claim 1, wherein the defrosting means is a bypass circuit, which is provided such that refrigerant bypasses the second evaporator during the defrosting operation.

4. The ejector cycle device according to claim 3, wherein the bypass circuit includes a passage switching member located at an upstream position of the second evaporator, and a bypass passage through which refrigerant bypasses the second evaporator during the defrosting operation.

5. The ejector cycle device according to claim 1, wherein the defrosting means is a bypass circuit, which is provided such that refrigerant bypasses the first evaporator during the defrosting operation.

6. The ejector cycle device according to claim 5, wherein the bypass circuit includes a passage switching member located between the ejector and an upstream position of the first evaporator, and a bypass passage through which refrigerant bypasses the first evaporator during the defrosting operation.

7. The ejector cycle device according to claim 5, wherein the bypass circuit includes a passage switching member located in the branch passage between the second evaporator and the refrigerant suction port, and a bypass passage through which refrigerant from the second evaporator bypasses the ejector and the first evaporator during the defrosting operation of the first evaporator.

8. The ejector cycle device according to claim 1, wherein the nozzle portion is a variable nozzle in which a throttle open degree of the nozzle portion is variable.

9. The ejector cycle device according to claim 1, further comprising
an electromagnetic valve arranged between the refrigerant radiator and the ejector to open and close a refrigerant passage between the refrigerant radiator and the ejector.

10. The ejector cycle device according to claim 1, wherein the refrigerant is one of chlorofluorocarbon refrigerant, hydrocarbon refrigerant and carbon dioxide refrigerant.

11. An ejector cycle device comprising:
a compressor for compressing refrigerant;
a refrigerant radiator disposed to radiate heat of refrigerant discharged from the compressor;
an ejector including a nozzle portion which decompresses refrigerant flowing out of the refrigerant radiator by converting pressure energy of the refrigerant to speed energy thereof, the ejector having a refrigerant suction port from which refrigerant is drawn by a refrigerant stream jetted from the nozzle portion;

a first evaporator for evaporating refrigerant flowing out of the ejector, the first evaporator having a refrigerant outlet coupled to a refrigerant suction side of the compressor;

a first branch passage, which is branched from a position between a refrigerant downstream side of the refrigerant radiator and the ejector, and is connected to the refrigerant suction port of the ejector;

a throttle member disposed in the first branch passage to decompress refrigerant and adjust a flow amount of refrigerant;

a second evaporator disposed in the first branch passage between the throttle member and the refrigerant suction port; and a bypass circuit which is provided such that refrigerant from the second evaporator is introduced to the refrigerant suction side of the compressor while bypassing the first evaporator.

12. The ejector cycle device according to claim 11, wherein the bypass circuit includes a passage switching member located in the first branch passage at a position between the second evaporator and the refrigerant suction port, and a bypass passage connected to the passage switching member and a position downstream from the first evaporator.

13. The ejector cycle device according to claim 11, wherein the bypass circuit includes a passage switching member arranged at a position between a downstream side of the ejector and the first evaporator, and a bypass passage connected to the passage switching member and a position downstream from the first evaporator.

14. The ejector cycle device according to claim 12, wherein the passage switching member is a three-way valve.

15. The ejector cycle device according to claim 11, further comprising:
a second branch passage which is branched from the first branch passage at an upstream side of the throttle member in the branch passage, and is connected to a downstream side of the first evaporator;
an opening/closing member provided to open and close the second branch passage;
a throttle valve disposed in the second branch passage to decompress refrigerant and to adjust a flow amount of refrigerant flowing through the second branch passage; and
a third evaporator disposed in the second branch passage to evaporate refrigerant decompressed in the throttle valve.

16. The ejector cycle device according to claim 11, further comprising:
a second branch passage which is branched from a position between a discharge port of the ejector and the first evaporator, and is connected to a downstream side of the first evaporator;
an opening/closing member provided to open and close the second branch passage; and
a third evaporator disposed in the second branch passage to evaporate refrigerant flowing from the discharge port of the ejector.

* * * * *